(12) United States Patent
Min et al.

(10) Patent No.: US 9,343,780 B2
(45) Date of Patent: May 17, 2016

(54) SECONDARY BATTERY

(71) Applicant: SK INNOVATION CO., LTD., Seoul (KR)

(72) Inventors: Jae Yun Min, Daejeon (KR); Eun Jin Kim, Daejeon (KR)

(73) Assignee: SK INNOVATION CO., LTD. (KR)

( * ) Notice: Subject to any disclaimer, the term of this patent is extended or adjusted under 35 U.S.C. 154(b) by 90 days.

(21) Appl. No.: 14/346,453

(22) PCT Filed: Oct. 18, 2012

(86) PCT No.: PCT/KR2012/008525
§ 371 (c)(1),
(2) Date: Mar. 21, 2014

(87) PCT Pub. No.: WO2013/058566
PCT Pub. Date: Apr. 25, 2013

(65) Prior Publication Data
US 2014/0255779 A1    Sep. 11, 2014

(30) Foreign Application Priority Data

Oct. 20, 2011    (KR) .................... 10-2011-0107339

(51) Int. Cl.
*H01M 2/16* (2006.01)
*H01M 10/0585* (2010.01)
(Continued)

(52) U.S. Cl.
CPC ............ *H01M 10/0585* (2013.01); *H01M 4/13* (2013.01); *H01M 4/625* (2013.01);
(Continued)

(58) Field of Classification Search
CPC .................... H01M 10/0436; H01M 10/0525; H01M 10/0585; H01M 4/13; H01M 4/625; H01M 4/628; Y02E 60/122
See application file for complete search history.

(56) References Cited

U.S. PATENT DOCUMENTS 6,524,738 B1    2/2003  Lee et al.
7,189,478 B2    3/2007  Iijima et al.
(Continued)

FOREIGN PATENT DOCUMENTS

EP          2367228       9/2011
JP        2003257496      9/2003
(Continued)

OTHER PUBLICATIONS

European Search Report—European Application No. 12841397.8 issued on Jun. 5, 2015, citing U.S. Pat. No. 6,524,738, US 2010/104948 and EP 2 367 228.

(Continued)

*Primary Examiner* — Patrick Ryan
*Assistant Examiner* — Ben Lewis
(74) *Attorney, Agent, or Firm* — Cantor Colburn LLP

(57) ABSTRACT

Provided is a secondary battery capable of preventing metal-plating and curling, the secondary battery including: at least one anode including an anode current collector and an anode active material layer coated on the anode current collector; at least one cathode including a cathode current collector, a cathode active material layer coated on one surface of the cathode current collector, which faces the anode, and an outermost coating layer coated on the other surface of the cathode current collector, which does not face the anode, the outermost coating layer being formed by coating an anode active material, an inorganic particle, or a mixture thereof; and at least one separator positioned between the cathode and the anode.

8 Claims, 3 Drawing Sheets

(51) Int. Cl.
*H01M 10/0525* (2010.01)
*H01M 4/13* (2010.01)
*H01M 4/62* (2006.01)
*H01M 10/04* (2006.01)

(52) U.S. Cl.
CPC ......... *H01M 4/628* (2013.01); *H01M 10/0436* (2013.01); *H01M 10/0525* (2013.01); *Y02E 60/122* (2013.01); *Y02P 70/54* (2015.11)

(56) References Cited

U.S. PATENT DOCUMENTS

2009/0214949 A1* 8/2009 Ugawa .................. H01M 4/621
429/199

2010/0104948 A1 4/2010 Skotheim et al.
2011/0117438 A1 5/2011 Han et al.
2011/0217588 A1* 9/2011 Roh ........................ H01M 4/62
429/163

FOREIGN PATENT DOCUMENTS

| | | |
|---|---|---|
| JP | 2005310618 | 11/2005 |
| JP | 2008277201 | 11/2008 |
| KR | 1020070053614 | 5/2007 |

OTHER PUBLICATIONS

International Search Report—PCT/KR2012/008525 dated Mar. 14, 2013.

* cited by examiner

SECONDARY BATTERY

TECHNICAL FIELD

The present invention relates to a secondary battery, and more particularly to a secondary battery capable of preventing curling during an electrode press process and suppressing metal-plating and thus improving stability and lifespan.

BACKGROUND ART

Batteries are largely divided into a primary battery and a secondary battery. The primary battery generates electricity by using an irreversible reaction, and thus is not reusable after being used once. The primary battery includes a dry cell, a mercury cell, a voltaic cell, and the like. Unlike this, the secondary battery uses a reversible reaction, and thus is reusable after being used by charging. The secondary battery includes a lead-acid battery, a lithium ion battery, a Ni—Cd battery, and the like.

The lithium ion battery, which is one of the secondary batteries, includes an anode generally made of carbon, a cathode generally made of a lithium compound, an electrolyte positioned between the two electrodes, and a wire connecting the anode and the cathode. Lithium ions in the electrolyte move toward the anode at the time of charging and toward the cathode at the time of discharging, and introduce a chemical reaction while extra electrons are desorbed from or adsorbed to the respective electrodes. In this procedure, electrons flow through the wire whereby electric energy is generated. The lithium ion battery has been described herein, but also in the cases of other secondary batteries, basic principles and structures thereof are the same only except that materials used for electrodes or electrolyte are different. That is, the secondary battery generally includes the anode, cathode, electrolyte, and wire as described above.

Here, the secondary battery may be composed of a single anode, a single cathode, a single electrolyte, and a single wire. However, generally, a plurality of unit cells each composed of a single anode, a single cathode, a single electrolyte, and a single wire are connected to constitute the secondary battery. That is, the plurality of unit cells as described above are included inside a secondary battery pack. Certainly, the respective unit cells are electrically connected to each other.

In general, the secondary battery includes a plurality of unit cells therein, and is constituted in a type where a pair of external terminal taps (i.e., a pair of taps functioning as electrodes per one battery, while anodes of the respective unit cells are connected to each other to thereby become one anode of the battery and cathodes of the respective unit cells are connected to each other to thereby become one cathode of the battery) connected to electrodes of the respective cells are exposed to the outside. In particular, as shown in Korean Patent Laid-Open Publication No. 2007-0053614, a stacked type lithium ion battery has a structure where a plurality of cathodes and anodes immersed in an electrolyte are stacked with a separator therebetween and electrically connected in parallel and in series. This secondary battery does not use single cathode and anode, but constitutes a battery as a single pack where a plurality of cathodes and anodes are connected.

However, in the case where a plurality of cathodes and anodes are provided, one surface of the cathode, which is an electrode positioned at the outermost side, is contacted with an anode, while the other surface of the cathode does not have a counter electrode. In this case, metal ions constituting a cathode active material come out from a coating of the cathode, at which a counter electrode is not present, and move to an anode positioned nearest. Therefore, an excessive amount of metal ions enter the anode, and as a result, a metal plating phenomenon occurs. This metal plating phenomenon may shorten the lifespan of the battery, deteriorate characteristics of the battery, and damage stability of the battery.

RELATED ART DOCUMENT

Patent Document (Patent Document 1) KR2007-0053614 A

DISCLOSURE OF INVENTION

Technical Problem

An object of the present invention is to provide a secondary battery capable of fundamentally preventing metal-plating and having prolonged lifespan and suppressed deterioration, and further, capable of preventing curling at the time of an electrode press process to thereby realize significantly excellent productivity and easily stacking electrodes.

Technical Solution

In one general aspect, a secondary battery includes: at least one anode including an anode current collector and an anode active material layer coated on the anode current collector; at least one cathode including a cathode current collector, a cathode active material layer coated on one surface of the cathode current collector, which faces the anode, and an outermost coating layer coated on the other surface of the cathode current collector, which does not face the anode, the outermost coating layer being formed by coating an anode active material, an inorganic particle, or a mixture thereof; and at least one separator positioned between the cathode and the anode.

The secondary battery may be composed of a plurality of cathodes, anodes, and separators, which are immersed in an electrolyte, and among the plurality of cathodes, a cathode having the outermost coating layer may be positioned at the outermost side thereof.

The outermost coating layer may be contacted with the cathode current collector, and more specifically, only the outermost coating layer may be provided on the opposite surface of the cathode current collector of the cathode positioned at the outermost side.

The secondary battery may be composed of N (N=a natural number of 2 or greater) cathodes and N−1 anodes, and at both ends of an electrode body where N cathodes and N−1 anodes are stacked with the separators therebetween may be positioned cathodes, the outermost cathodes positioned at both ends of the electrode body having the outermost coating layers, respectively.

Here, each of the cathodes except the cathodes positioned at the outermost sides may have cathode active material layers formed by coating a cathode active material on both opposed surfaces of the cathode current collector thereof.

The anode active material contained in the outermost coating layers may be graphite, amorphous carbon, lithium titanate ($Li_4Ti_5O_{12}$), titanium dioxide ($TiO_2$), Si, Si alloy, Sn, Sn alloy, or a mixture thereof.

The inorganic particle, contained in the outermost coating layers, may be $Al_2O_3$, $SiO_2$, $ZrO_2$, $ZnO_2$, or a mixture thereof.

Preferably, the outermost coating layer may contain the anode active material or the inorganic particle, and more preferably, the outermost coating layer may contain the anode active material and the inorganic particle.

The outermost coating layer may contain 5 to 400 parts by weight of the inorganic particle based on 100 parts by weight of the cathode active material. The outermost coating layer may have density per unit area of the cathode current collector of 3 g/cm$^2$ to 30 g/cm$^2$.

The secondary battery may include a secondary battery of charging and discharging are performed by separation/insertion of metal ions contained in a cathode active material, and as a substantial example, the secondary battery may include a lithium ion battery or a lithium ion polymer battery.

Advantageous Effects of Invention

As set forth above, in the secondary battery according to the present invention, among a plurality of cathodes, each of the cathodes positioned at the outermost sides has a cathode active material layer formed by coating a cathode active material on one surface of the cathode current collector, which faces the anode with the separator therebetween, and has the outermost coating layer formed by coating an anode active material, an inorganic particle, or a mixture thereof, on the other surface, which is opposite to one surface of the cathode current collector. For this reason, curling can be prevented during the electrode pressing process and metal-plating due to metal ions contained in the cathode active material can be suppressed, and thus stability and lifespan of the battery can be improved.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
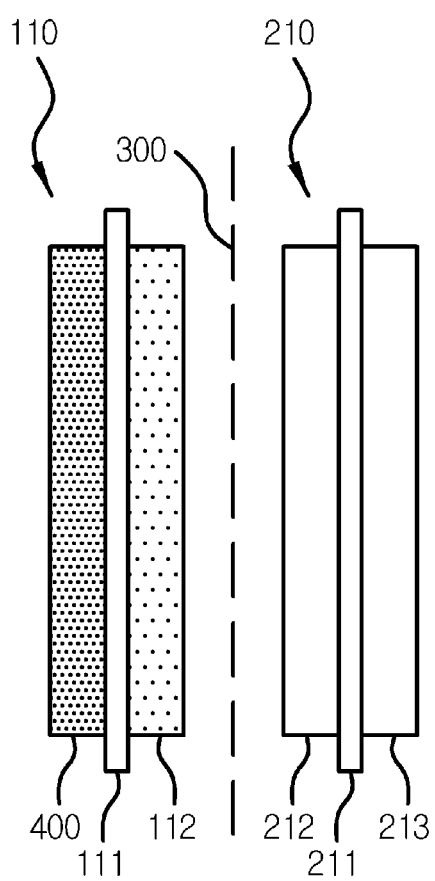
FIG. 1 is a cross-sectional view showing secondary battery according to one embodiment of the present invention.

110: outermost cathode 120, 130: cathode
210, 220, 230: anode 300: separator
111: outermost cathode current collector
121: cathode current collector
211: anode current collector
112, 122, 123: cathode active material layer
212, 213: anode active material layer
400: outermost coating layer

MODE FOR THE INVENTION

Hereinafter, a secondary battery of the present invention will be described in detail with reference to the accompanying drawings. The drawings exemplified below are provided by way of examples so that the spirit of the present invention can be sufficiently transferred to those skilled in the art to which the present invention pertains. Therefore, the prevent invention is not limited to the drawings set forth below, and may be embodied in different forms, and the drawings set forth below may be exaggerated in order to clarify the spirit of the present invention. Also, the same reference numerals denote the same elements throughout the specification.

Here, unless indicated otherwise, the terms used in the specification including technical and scientific terms have the same meaning as those that are usually understood by those who skilled in the art to which the present invention pertains, and detailed description of the known functions and constitutions that may obscure the gist of the present invention will be omitted.

A secondary battery according to an embodiment of the present invention includes: at least one anode including an anode current collector and an anode active material layer coated on the anode current collector; at least one cathode including a cathode current collector, a cathode active material layer coated on one surface of the cathode current collector, which faces the anode, and an outermost coating layer coated on the other surface of the cathode current collector, which does not face the anode, the outermost coating layer being formed by coating an anode active material, an inorganic particle, or a mixture thereof; and at least one separator positioned between the cathode and the anode.

FIG. 1 is a cross-sectional perspective view of a secondary battery according to one embodiment of the present invention. A secondary battery according to one embodiment of the present invention may include a cathode 110 where a cathode active material is coated on a cathode current collector 111, an anode 210 where an anode active material is coated on an anode current collector 211, and a separator 300 positioned between the cathode 110 and the anode 210, and further includes an electrolyte (not shown) in which the anode 210, the cathode 110, and the separator 300 are immersed.

As shown in FIG. 1, the secondary battery according to the present invention has a battery structure where the single cathode 110, the single separator 300, and the single anode 210 are immersed in the electrolyte. The cathode 110 has a cathode active material layer 112 containing a cathode active material and has an outermost coating layer 400 containing an anode active material, an inorganic particle, or a mixture thereof. The cathode active material layer 112 is formed on one surface of the cathode current collector 111, which faces the anode 210 with the separator 300 therebetween. The outermost coating layer 400 is formed on an opposite surface to one surface of the cathode current collector 111, on which the cathode active material layer 112 is formed.

That is, the outermost coating layer 400 is formed at one side of the cathode, at which a counter electrode (anode) is not present, and serves to prevent occurrence of metal-plating on the anode due to metal ions contained in the cathode active material and suppress occurrence of curling at the time of manufacturing the cathode by pressing.

Figure 2:
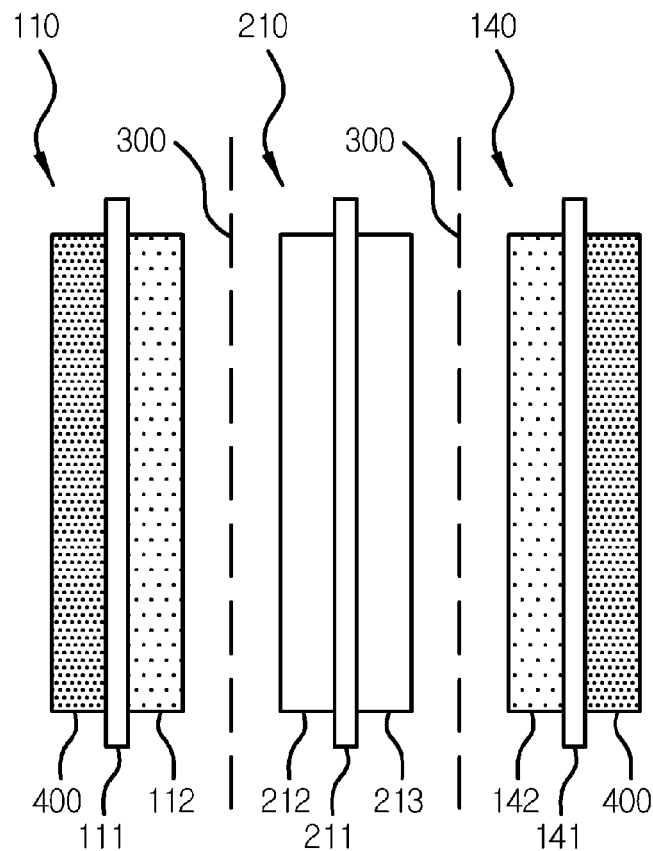
FIG. 2 is a cross-sectional view showing a secondary battery according to another embodiment of the present invention.

FIG. 2 is a cross-sectional view of a secondary battery according to another embodiment of the present invention. In another embodiment of the present invention, the secondary battery has an electrode structure where an electrode body including a cathode 110—a separator 300—an anode 210—a separator 300—a cathode 140 is immersed in an electrolyte (not shown).

In the embodiment shown in FIG. 2, all of electrodes positioned at the outermost sides of the secondary battery are cathodes 110 and 140. The respective cathodes 110 and 140 positioned at the outermost sides have outermost coating layers 400.

Here, the electrodes (cathode or anode) positioned at the outermost sides mean electrodes (cathodes or anodes) positioned at one end or both ends in a direction in which the cathodes, separators, and anode constituting the secondary battery are stacked.

The outermost coating layers 400 respectively provided in the two cathodes 110 and 140 positioned at the outermost sides, independently, contain an anode active material, an inorganic particle, or a mixture thereof. For example, the outermost coating layer 400 provided on one cathode 110 positioned at the outermost side may contain an anode active material, and the outermost coating layer 400 provided on the other cathode 140 positioned at the outermost side may contain an anode active material and an inorganic particle.

In the secondary battery according to the embodiment of the present invention shown in FIG. 2, in each of the two cathodes 110 and 140 positioned at the outermost sides, the outermost coating layer 400 is formed on one side of the cathode, at which a facing counter electrode (anode) is not present, and prevents metal-plating and occurrence of curling and suppresses a side reaction by a non-charged anode and an irreversible reaction.

Figure 3:
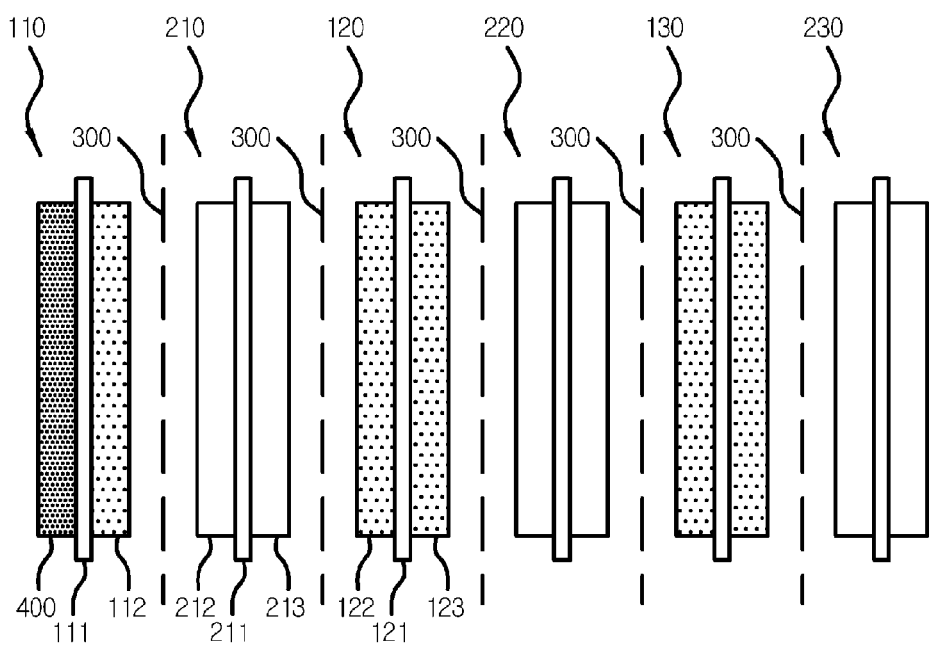
FIG. 3 is a cross-sectional view showing a secondary battery according to still another embodiment of the present invention.

FIG. 3 is a cross-sectional view of a secondary battery according to still another embodiment of the present invention. As shown in FIG. 3, the secondary battery includes cathodes 110, 120, and 130 where a cathode active material is coated on cathode current collectors 111 and 121, anodes 210, 220, and 230 where an anode active material is coated on anode current collectors 211, and separators 300 positioned between the cathodes 110, 120, and 130 and the anodes 210, 220, and 230. The secondary battery has an electrode structure where the plurality of cathodes 110, 120, and 130, anodes 210, 220, and 230, and separators 300 are immersed in an electrolyte (not shown). The cathode 110 is positioned at the outermost side of an electrode body where the plurality of cathodes 110, 120, and 130, the plurality of anodes 210, 220, and 230, and the plurality of separators 300 are stacked.

Similar to the embodiment shown in FIG. 1, in the secondary battery including the plurality of cathodes and the plurality of anodes, an outermost coating layer 400 is provided in the cathode 110, which is positioned at the outermost side among the plurality of cathodes. The outermost coating layer 400 contains an anode active material, an inorganic particle, or a mixture thereof.

Specifically, the secondary battery according to the embodiment shown in FIG. 3 has a structure where the plurality of cathodes 110, 120, and 130 and the plurality of anodes 210, 220, and 230 are alternately stacked with the separators 300 therebetween. For this reason, one surface of two opposed surfaces of the cathode current collector 111 of the cathode 110 positioned at the outermost side (hereinafter, the outermost cathode) is contacted with the anode 210 with the separator 300 therebetween, while a counter electrode is not present at the other surface of the two opposed surfaces of the cathode current collector 111.

The outermost cathode 110 has the cathode active material layer 112 and the outermost coating layer 400. The cathode active material layer 112 is provided on a surface of the cathode current collector 111, which faces the anode 210 with the separator 300 therebetween, and the outermost coating layer 400 is provided on a surface of the cathode current collector 111, which is opposite to the cathode active material layer 112.

As described above, in the embodiment of the present invention shown in FIG. 3, the outermost coating layer 400 is provide in the outermost cathode 110, that is, the outermost coating layer 400 is provided on one surface of two opposed surfaces of the cathode current collector 111 of the outermost cathode 110, at which a facing counter electrode is not present, to thereby prevent metal-plating due to excessive release of metal ions contained in the cathode active material and thus improve stability and lifespan.

Further, conventionally, the cathodes 110, 120, and 130 are manufactured by coating a cathode active material on the cathode current collectors 111 and 121 and then performing a pressing process. Here, the outermost coating layer 400 is provided in the outermost cathode 110, to thereby prevent metal-plating and prevent curling during the pressing process and thus achieve high productivity, prevent defects, and facilitate the stack of the cathodes and anodes.

Figure 4:
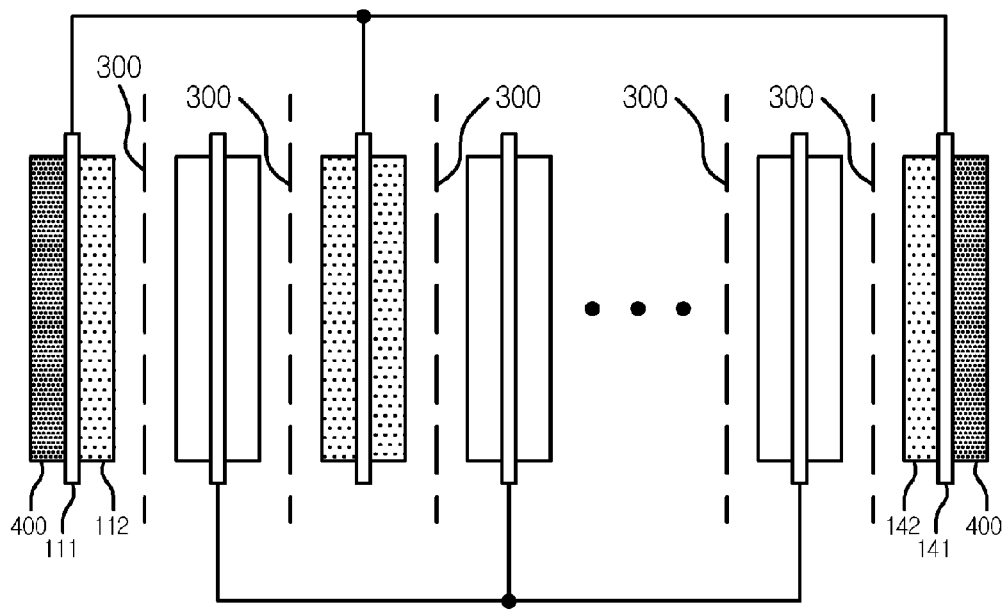
FIG. 4 is a cross-sectional view showing a secondary battery according to still another embodiment of the present invention.

FIG. 4 is a cross-sectional view of a secondary battery according to still another embodiment of the present invention. The secondary battery according to the embodiment shown in FIG. 4 includes N (N=a natural number of 2 or greater) cathodes 110, 120~140, and N−1 anodes 210, 220~240. The cathodes 110 and 140 are positioned at both ends of an electrode body where N cathodes 110, 120~140 and N−1 anodes 210, 220~240 are stacked with separators 300 therebetween. Outermost coating layers 400 are provided in the outermost cathodes 110 and 140 positioned at both ends of the electrode body.

Specifically, as shown in FIG. 4, the outermost cathode 110 positioned at one end of the electrode body has a cathode active material layer 112 and the outermost coating layer 400. The cathode active material layer 112 is provided on a surface thereof, which faces a neighboring anode 210 with the separator 300 therebetween, and the outermost coating layer 400 is provided on the opposite surface of the cathode active material layer 112.

Also, the outermost cathode 140 positioned at the other end of the electrode body has a cathode active material layer 142 and the outermost coating layer 400. The cathode active material layer 142 is provided on a surface thereof, which faces a neighboring anode 240 with the separator 300 therebetween, and the outermost coating layer 400 is provided on the opposite surface of the cathode active material layer 142.

In the embodiment shown in FIG. 4, the number of cathodes and anodes provided in the secondary battery may be designed in consideration of a targeting battery capacitance. As a substantial example, the number of cathodes (N) may be 10 to 30.

As shown in FIG. 4, the cathodes constituting the electrode body may have a structure where non-coated portions of the cathodes (for example, ends of current collectors, on which a cathode active material is not coated) are connected with each other by a conductive wire so that the plurality of cathodes are electrically connected to each other. Together with this, the anodes constituting the electrode body may have a structure where non-coated portions of the anodes (for example, ends of current collectors, on which an anode active material is not coated) are connected with each other by a conductive wire so that the plurality of anodes are electrically connected to each other.

Here, although not shown in the drawing, a housing sealing the plurality of cathodes, anodes, and separators, and an electrolyte may be provided. The housing may certainly include taps electrically connected with the cathodes and the anodes therein.

As described based on the embodiments shown in FIGS. 1 to 4, the secondary battery according to the present invention includes the outermost coating layers provided in the cathodes positioned at the outermost sides, the outermost coating layer containing an anode active material, an inorganic particle, or a mixture thereof, to thereby fundamentally prevent metal-plating and curling. Further, the cathodes are positioned at both ends of the electrode body, to thereby prevent metal-plating and occurrence of curling and prevent a side reaction due to a non-charged anode and an irreversible reaction.

In order to effectively prevent metal-plating, maintain a usual electrode manufacturing process as it is, and manufacture cathodes and anodes provided in the secondary battery according to the present invention, the outermost coating layer preferably contains an anode active material. That is, as the outermost coating layer is formed of an anode active material, the outermost cathode capable of preventing metal-plating and curling can be manufactured without changing the established process line, the process apparatus, and materials at the time of manufacturing usual electrodes.

In order to prevent metal-plating and prevent curling more effectively during the electrode pressing process, the outermost coating layer preferably contains an inorganic particle.

In order to prevent metal-plating effectively and prevent curling in the electrode pressing process, the outermost coating layer 400 preferably contains an anode active material and an inorganic particle. For this reason, the outermost coating layer may contain 5 to 400 parts by weight of the inorganic particle based on 100 parts by weight of the anode active material. In order to prevent metal-plating and secure a curling level equal to or lower than that of the cathode having cathode active material layers provided on both surfaces thereof, the outermost coating layer 400 may contain 5 to 400 parts by weight of the inorganic particle based on 100 parts by weight of the anode active material.

The anode active material contained in the outermost coating layer contains graphite, amorphous carbon, lithium titanate ($Li_4Ti_5O_{12}$), titanium dioxide ($TiO_2$), Si, Si alloy, Sn, Sn alloy, or a mixture thereof.

The inorganic particle means a metal ion non-reactive inorganic particle which does not have an electrochemical reaction with a metal ion contained in the cathode active material during charging or discharging of the secondary battery. Specifically, it means an inorganic particle which does not electrochemically react with a metal ion including a lithium ion or sodium ion, and more specifically, it means an inorganic particle which does not cause insertion or separation of a metal ion including a lithium ion or sodium ion during charging or discharging of the secondary battery.

Specifically, the inorganic particle may include $Al_2O_3$, $SiO_2$, $ZrO_2$, $ZnO_2$, or a mixture thereof, and the inorganic particle may have a diameter of 0.3 μm to 10 μm.

The composition of the outermost coating layer and the size of the inorganic particle are such a composition and a size that prevents metal-plating and occurrence of curling at the time of pressing electrodes.

As described in the embodiments shown in FIGS. 1 to 4, preferably, the outermost coating layers 400 are contacted with the cathode current collectors 111 and 141, and have sizes and shapes corresponding to those of the cathode active material layers 112 and 142 formed on the cathode current collectors 111 and 141. It is preferable to form only the outermost coating layer 400 on one surface of each of the cathode current collectors 111 and 141 of the outermost cathodes 110 and 140.

The cathode active material layers 112, 122, 123, and 142 have density per unit area of the cathode current collector (density after pressing) of 3 g/cm² to 30 g/cm². In order to prevent curling at the time of coating an active material and performing a pressing process more effectively, the outermost coating layers 400 preferably have density per unit area of the cathode current collector (density after pressing) of 3 g/cm² to 30 g/cm².

As shown in FIGS. 3 and 4, each of the cathodes 120 and 130 except the outermost cathodes 110 and 140 has cathode active material layers 122 and 123 respectively formed on both opposed surfaces of the cathode current collector 121. Each of the anodes 210, 220, and 230 has anode active material layers 212 and 213 formed by coating an anode active material on both opposed surfaces of the anode current collector 211.

Here, the separators 300 are respectively positioned between the cathode active material layers 112 and 122 and the anode active material layers 212 and 213, which are disposed to face each other. Although not shown in the drawings, separators 300 may be further provided at sides of the outermost cathodes 110 and 140, at which the outermost coating layers 400 are formed. The same cathode active material layers are provided in all the cathodes, except for the outermost coating layers 400 of the outermost cathodes 110 and 140.

Any cathode current collector that can be used in general secondary batteries may be used as the cathode current collector. For example, a film type copper, aluminum, nickel, or an alloy thereof may be used.

Any anode current collector that can be used in usual secondary batteries may be used as the anode current collector. For example, a film type copper, aluminum, nickel, or an alloy thereof may be used.

Any cathode active material that can be used in usual secondary batteries may be used as the cathode active material. In the case of a lithium ion secondary battery, the cathode active material may include Li—Mn—O based lithium complex oxides, Li—Ni—O based lithium complex oxides, Li—Co—O based lithium complex oxides, Li-M-M'-O (M represents one or two or more elements selected from Ni and Co, and M' represents one or two or more elements selected from Cr, V, Fe, W, Ta, Mn, Al, and Ti) based lithium complex oxides, Li—Fe—P—O based lithium complex oxides, or a mixture thereof. More specifically, the cathode active material contained in the outermost coating layer 400 may include $LiMn_2O_4$, $LiMnO_2$, $LiCoO_2$, $LiNiO_2$, $LiNi_{(1-x-y)}Co_xMn_yO_2$ (0.01≤x≤0.3, 0.01≤y≤0.3), $Li_xFe_yPO_4$ (0.8≤x≤1.2, 0.8≤y≤1.2), $LiMn_{2-x}M_xO_4$ (M represents at least one element selected from Co, Ni, Cr, Al and Mg, and 0≤x≤0.5), or a mixture thereof.

Any anode active material that can be used in general secondary batteries may be used as the anode active material included in the anode. In the case of a lithium ion secondary battery, the anode active material included in the anode may be graphite, amorphous carbon, lithium titanate ($Li_4Ti_5O_{12}$), titanium dioxide ($TiO_2$), Si, Si alloy, Sn, Sn alloy, or a mixture thereof.

The cathode may be manufactured by coating and drying a slurry containing the cathode active material on both opposed surfaces of the cathode current collector, followed by pressing. Here, the outermost cathode may be manufactured by coating and drying a cathode active material, preferably a slurry containing the cathode active material, on one surface of the cathode current collector thereof while coating and drying a slurry containing an anode active material, an inorganic particle, or a mixture thereof on the other surface of the cathode current collector thereof, followed by pressing.

The anode may be also manufactured by coating and drying a slurry containing an anode active material on both opposed surfaces of the anode current collector, followed by pressing, like the cathode.

Here, the slurry for manufacturing the electrode active material layer or the outermost coating layer may further contain an additive having a usual binder such as polyvinylidene fluoride.

The electrolyte includes a liquid phase electrolyte used in generally secondary batteries. The liquid phase electrolyte may be one where a salt of metal ion involved in charging and discharging of the battery is dissolved in a solvent. In the case of a lithium ion secondary battery, the electrolyte may be one where a lithium salt including lithium perchlorate or lithium fluoroborate is dissolved in a solvent. An example of the lithium salt may be at least one selected from the group consisting of $LiPF_6$, $LiBF_4$, $LiSbF_6$, $LiAsF_6$, $LiTaF_6$, $LiAlCl_4$, $LiPF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiCl$, and $LiI$.

As the solvent of the liquid phase electrolyte, a solvent that is generally used as a solvent of an electrolyte in a secondary battery, such as, carbonates, esters, ethers, formates, amides, lactones, sulfones, nitriles, or the like. An example of the solvent of the liquid phase electrolyte may be at least one selected from the group consisting of ethylene carbonate, propylene carbonate, butylene carbonate, dimethyl carbonate, diethyl carbonate, di(2,2,2-trifluoroethyl) carbonate, dipropyl carbonate, dibutyl carbonate, ethyl methyl carbonate, 2,2,2-trifluoroethyl methyl carbonate, methyl propyl carbonate, ethyl propyl carbonate, 2,2,2-trifluoroethyl propyl carbonate, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, tetrahydrofuran, 2-methyl tetrahydrofuran, 1,3-dioxolane, 1,4-dioxane, 1,2-dimethoxy ethane, 1,2-diethoxy ethane, 1,2-dibutoxy ethane, acetonitrile, dimethyl formamide, γ-butyrolactone, 2-methyl-γ-butyrolactone, 3-methyl-γ-butyrolactone, 4-methyl-γ-butyrolactone, β-propiolactone and δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl) sulfone, di(pentafluoroethyl) sulfone, trifluoromethyl pentafluoroethyl sulfone, trifluoromethyl nonafluoromethyl sulfone, pentafluoroethyl nonafluorobutyl sulfone, acetonitrile, propionitrile, butyronitrile, N,N-dimethyl formamide, N,N-dimethyl acetamide, N,N-diethyl acetamide, and N,N-dimethyl trifluoroacetamide.

The separator may be a separator that can be usually used in the secondary battery, in order to prevent short circuits between the cathodes and the anodes, and, certainly, serve to support the electrolyte. Examples of the separator may be a microporous film containing polyethylene including polyethylene, polypropylene, or polyolefin, and may have a stacked structure where a plurality of organic films such as polyethylene films, polypropylene films, non-woven films, and the like are stacked in order to improve an over-current prevention function and an electrolyte maintenance function and enhance physical strength.

In the secondary battery of the present invention, the separators are for preventing short circuits between the anodes and the cathodes in the liquid phase electrolyte. Therefore, in the case where a gel type electrolyte or a polymer electrolyte is provided, the gel type electrolyte or the polymer electrolyte instead of the separator may be certainly positioned in contact with the cathodes and the anodes.

The secondary battery of the present invention as described based on FIGS. 1 to 4 includes a secondary battery where charging and discharging of the battery are performed by separation/insertion of the metal ions contained in the cathode active material. The metal ions includes a lithium ion or a sodium ion, and the secondary battery includes a lithium ion battery or a lithium ion polymer secondary battery.

Figure 5:
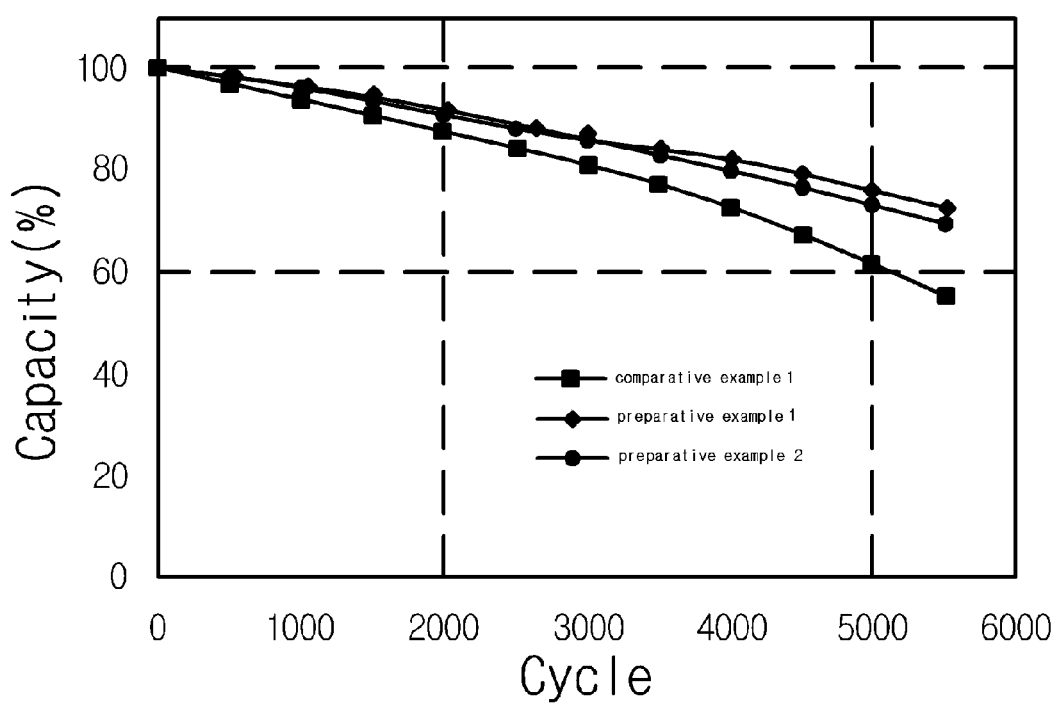
FIG. 5 shows a measured change in capacity according to the charging and discharging cycle of a secondary battery manufactured by the present invention.

FIG. 5 shows a measured change in capacity according to the charging and discharging cycle of the secondary battery manufactured by the present invention, by using a lithium ion battery as one example.

Specifically, FIG. 5 shows results of Preparative Examples where 21 sheets of cathodes, 20 sheets of separators, and 20 sheets of anodes were stacked in an electrolyte in which 1M of $LiPF_6$ was dissolved in a mixture solvent of ethyl carbonate and ethylmethyl carbonate (EC:EMC=1(V):2(V)) while two of the cathodes were positioned at the outermost sides thereof. Here, a cathode (180 mm×90 mm, thickness: 78 μm) where a cathode active material such as $LiMn_2O_4$ was coated on both surfaces of an aluminum current collector was used for each of the cathodes; an anode (180 mm×90 mm, thickness: 68 μm) where an anode active material such as graphite was coated on both surfaces of a copper current collector was for each of the anodes; and a PE material separator was used for each of the separators.

The results of Preparative Example 1 and Preparative Example 2 in FIG. 5 were measurement results for a battery where the outermost coating layers were formed in two cathodes positioned at the outermost sides, among 21 sheets of cathodes, similar to FIG. 4. The outermost coating layers provide in the outermost cathodes in Preparative Example 1 contains graphite as an anode active material and alumina as an inorganic particle, which were mixed in a weight ratio of 1:1.

The results of Preparative Example 2 in FIG. 5 were measurement results for a battery where the outermost coating layers provided in the outermost cathodes are formed of graphite as an anode active material.

The results of Comparative Example in FIG. 5 were measurement results for a battery where the outermost coating layers were not provided, and each of the outermost cathodes, like the cathodes positioned inside, had cathode active material layers formed on both surfaces of the current collector thereof.

In the case of a cathode manufactured by coating a cathode active material on both surfaces of a current collector thereof, followed by pressing, curling occurred within 1 mm at the time of pressing. In the case of a cathode manufactured by coating a cathode active material on only one surface of a current collector thereof but not forming a coating layer on the other surface of the current collector (in the case where the entire of the other surface is a non-coated portion), curling occurred at a level of 3 mm or greater at the time of pressing.

In the case of the outermost cathode (electrode including an outermost coating layer having a weight ratio of graphite and alumina of 1:1 and a cathode active material layer of $LiMn_2O_4$) of Preparative Example 1, curling occurred within a level of 1 mm at the time of pressing. In the case of the outermost cathode (electrode including an outermost coating layer of graphite and a cathode active material layer of LiMn$_2$O$_4$) of Preparative Example 2, curling occurred within a level of 1 mm to 2 mm at the time of pressing.

As the curling occurred at a higher level, the possibility that the battery is non-uniformly charged and discharged becomes very high, and thus, the performance and lifespan of the battery are rapidly reduced. It can be seen that, in the case where the outermost coating layers according to the present invention are provided, metal-plating can be prevented and occurrence of curling can be suppressed to the same level as general cathodes where a cathode active material is coated on both surfaces thereof, and thus the performance and lifespan of the battery are improved.

In addition, in the case where the outermost coating layer is formed of an anode active material, the occurrence level of curling is slightly increased as compared with general cathodes, but an anode active material slurry used at the time of manufacturing anodes is used as it is and a method of coating the anode active material slurry is employed as it is, and thus, productivity can be improved and the production cost can be lowered.

FIG. 5 shows capacity confirmed by performing charging and discharging at 6 A (1C—rate) every 500 cycles in SOC 0~100% while charging and discharging conditions for the charging and discharging cycle were current of 30 A (5C rate), charging of 4.2V, and discharging of 2.7V cut-off.

As shown in the measurement results of Preparative Examples 1 and 2, it can be seen that, in the case of the secondary battery according to the present invention, since the outermost coating layers are provided in the outermost cathodes, a metal (lithium)-plating phenomenon can be prevented, and thus, the reduction in cell capacity due to deterioration caused by a side reaction of the plated metal can be significantly improved.

The invention claimed is:

1. A secondary battery, comprising:
   at least one anode including an anode current collector and an anode active material layer coated on the anode current collector;
   at least one cathode including a cathode current collector, a cathode active material layer coated on one surface of the cathode current collector, which faces the anode, and an outermost coating layer coated on the other surface of the cathode current collector, which does not face the anode, the outermost coating layer being formed by coating an anode active material and inorganic particle; and
   at least one separator positioned between the cathode and the anode,
   wherein the secondary battery is a lithium ion battery or a lithium ion polymer battery, and the outermost coating layer contains 5 to 400 parts by weight of the inorganic particle based on 100 parts by weight of the anode active material.

2. The secondary battery of claim 1, wherein the at least one cathode, the at least one anode and the at least one separator are immersed in an electrolyte, and a cathode having the outermost coating layer is positioned at an outermost side of the secondary battery.

3. The secondary battery of claim 2, wherein the at least one cathode includes N (N=a natural number of 2 or greater) cathodes, and the at least one anode includes (N−1) anodes, and wherein the N cathodes and the (N−1) anodes are stacked with the at least one separator therebetween to form an electrode body, and the cathode having the outermost coating layer is positioned at both outermost sides of the electrode body.

4. The secondary battery of claim 3, wherein the N is three or greater, the N cathodes further include a cathode having cathode active material layers on both opposed surfaces of the cathode current collector thereof.

5. The secondary battery of claim 1, wherein the inorganic particle is Al$_2$O$_3$, SiO$_2$, ZrO$_2$, ZnO$_2$, or a mixture thereof.

6. The secondary battery of claim 1, wherein the anode active material is graphite, amorphous carbon, lithium titanate (Li$_4$Ti$_5$O$_{12}$), titanium dioxide (TiO$_2$), Si, Si alloy, Sn, Sn alloy, or a mixture thereof.

7. The secondary battery of claim 1, wherein the outermost coating layer has density per unit area of the cathode current collector of 3 g/cm$^2$ to 30 g/cm$^2$.

8. The secondary battery of claim 1, wherein the outermost coating layer is contacted with the cathode current collector.

* * * * *